US012749938B2

(12) United States Patent
Rössert et al.

(10) Patent No.: US 12,749,938 B2
(45) Date of Patent: Sep. 29, 2026

(54) DISTRIBUTED WINDING

(71) Applicant: ZF Friedrichshafen AG, Friedrichshafen (DE)

(72) Inventors: Alexander Rössert, Grettstadt (DE); Bernhard Schmitt, Schweinfurt (DE); Kaijun Xu, Schonungen (DE); Kai Mehlstäubl, Würzburg (DE); Tobias Schrenk, Bad Neustadt an der Saale (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 564 days.

(21) Appl. No.: 18/003,241

(22) PCT Filed: Jun. 17, 2021

(86) PCT No.: PCT/EP2021/066418
§ 371 (c)(1),
(2) Date: Dec. 23, 2022

(87) PCT Pub. No.: WO2021/259753
PCT Pub. Date: Dec. 30, 2021

(65) Prior Publication Data

US 2023/0253845 A1 Aug. 10, 2023

(30) Foreign Application Priority Data

Jun. 25, 2020 (DE) ......................... 102020207906.4

(51) Int. Cl.
*H02K 3/28* (2006.01)
*H02K 15/0428* (2025.01)

(52) U.S. Cl.
CPC .......... *H02K 3/28* (2013.01); *H02K 15/0428* (2013.01)

(58) Field of Classification Search
CPC .......... H02K 15/0414; H02K 15/0428; H02K 15/0421; H02K 15/0643; H02K 15/36;
(Continued)

(56) References Cited

U.S. PATENT DOCUMENTS

2003/0137207 A1 7/2003 Tamura et al.
2005/0258703 A1* 11/2005 Kouda .................... H02K 1/00 310/180

(Continued)

FOREIGN PATENT DOCUMENTS

CN 110752693 A 2/2020
DE 11 2014 003 897 T5 6/2016

(Continued)

OTHER PUBLICATIONS

18003241_2025-01-29_JP_2007097260_A_H.pdf (Year: 2025).*

(Continued)

*Primary Examiner* — Christopher M Koehler
*Assistant Examiner* — Ahmed F Seck
(74) *Attorney, Agent, or Firm* — Crowell & Moring LLP

(57) ABSTRACT

A distributed winding for an electric machine may include a coil body with numerous grooves distributed over its circumference, where there are at least two poles for the winding, where there are at least two parallel winding strands for each pole, where each winding strand is composed of at least one wire, which has at least one groove region that runs axially in a groove and a connection region at both ends, where the connection regions protrude axially above the coil body, where each winding strand has contact pins that form connection regions on both ends, and where at least some of the contact pins in the same phase are located in adjacent grooves. That at least one of the adjacent (Continued)

contact pins in the same phase may be bent along the circumference in order to minimize the spacing between the contact pins.

14 Claims, 3 Drawing Sheets

(58) Field of Classification Search
CPC .. H02K 3/04; H02K 3/12; H02K 3/14; H02K 3/28; H02K 3/40; H02K 3/48
See application file for complete search history.

(56) References Cited

U.S. PATENT DOCUMENTS

| | | | | |
|---|---|---|---|---|
| 2007/0018525 | A1 * | 1/2007 | Cai | B60L 50/16 310/201 |
| 2009/0140596 | A1 | 6/2009 | Kaiser et al. | |
| 2013/0009509 | A1 * | 1/2013 | Tsuge | H02K 15/0431 310/201 |
| 2014/0035406 | A1 * | 2/2014 | Ishizuka | H02K 15/021 310/71 |

FOREIGN PATENT DOCUMENTS

| | | | | | |
|---|---|---|---|---|---|
| DE | 10 2017 201 533 | A1 | | 8/2018 | |
| DE | 10 2017 210 445 | A1 | | 12/2018 | |
| DE | 10 2018 219 536 | A1 | | 5/2020 | |
| JP | 2007097260 | A | * | 4/2007 | |
| WO | WO-2019170349 | A1 | * | 9/2019 | H02K 3/12 |

OTHER PUBLICATIONS

18003241_2025-01-29_WO_2019170349_A1_H.pdf (Year: 2025).*
International Search Report and Written Opinion of the International Search Authority mailed Sep. 28, 2021 in International Application No. PCT/EP2021/066418 (English and German languages) (12 pp.).
Office Action dated Apr. 1, 2021 for German Patent Application No. 10 2020 207 906.4 (12 pp.), note: pp. 1 and 2 are English language Explanations to Section C. Result of Determination Document.

* cited by examiner

DISTRIBUTED WINDING

RELATED APPLICATION(S)

This application is a filing under 35 U.S.C. § 371 of International Patent Application PCT/EP2021/006418, filed Jun. 17, 2021, and claiming priority to German Patent Application 10 2020 207 906.4, filed Jun. 25, 2020. All applications listed in this paragraph are hereby incorporated by reference in their entireties.

TECHNICAL FIELD

The present disclosure relates to a distributed winding for an electric machine, in particular for use in a motor vehicle that has a hybrid drive comprising an internal combustion engine and an electric machine.

BACKGROUND

In addition to concentrated windings, electric machines with distributed windings are also known in the prior art. Distributed windings are normally produced using the so-called hairpin technology, in which numerous conductor elements are placed in grooves on a coil body, and connected to corresponding phase windings. The ends of the phase windings are then connected to one another and power electronics via electrical connections. The connections are normally obtained with contact bars curved along the circumference in which the ends are connected to the contact bars where they protrude away from the coil. Maintaining necessary insulation and creepage distances is frequently a problem, in particular in electric machines that have a higher operating voltage and/or in smaller electric machines.

BRIEF DESCRIPTION

One object of the invention is to create a distributed winding that can be operated with a high voltage. Another object is to obtain sufficient insulation in distributed windings for electric machines that have a small diameter. A further object is to also create a corresponding production method.

These problems are solved by a distributed winding for an electric machine that has a coil body with numerous grooves distributed over its circumference in which there are at least two poles for the winding, there are at least two parallel winding strands for each pole, each winding strand comprises at least three wires, which each have at least one groove region that runs axially in a groove and a contact region at each end, with these contact regions protruding axially above the coil body, wherein each winding strand has contact pins at each end that form the connection regions, and at least a portion of the contact pins of the same phase are placed in adjacent grooves, characterized in that at least one of the adjacent contact pins of the same phase is bent along the circumference in order to minimize the spacing between the contact pins.

With two poles, each pair of adjacent grooves is assigned to a pole. The distributed winding is formed by numerous partial coils or winding strands. The present patent application relates to windings in which there are at least two winding strands connected in parallel for each phase, such that there are at least two for each pole where the winding strands end, one for each winding strand.

Instead of two, there can also be three, four, or more poles, in which case three, four, or more adjacent grooves form a pole. This means that the number of parallel winding strands can also be greater, i.e. three, four, or more parallel winding strands, and it is also possible to have windings with just two parallel winding strands and three, four, or more poles.

The winding strands are formed by wires, each of which have a groove region extending along a groove, which transitions into a contact region at each end that protrudes axially above the coil body. If a winding strand comprises numerous wires connected in series to one another, the connection regions are bent circumferentially in order to be able to connect the connection regions of the wires, in particular through welding. The contact pins are also bent along the circumference in this case. This is optional with winding strands made of a single wire. A wire can also have numerous groove regions that are connected to one another by another region.

At least one of the contact pins is bent such that the spacing between two adjacent pins of the same phase is minimized along the circumference. Consequently, the contact pins can be connected directly to one another as well as to a power connection, in particular through welding, thus simplifying the connecting and making it easier to produce. Depending on the number winding strands, phases, and their distribution over the circumference, it may not be necessary to use the normal curved contact bars, and instead, it may be possible to connect the windings directly using flat conductors or flexible conductors between the contact pins and the power electronics. This simplifies the construction, reduces the installation space, and may increase the number of identical parts that can be used for different electric machines. A further advantage is that as a result of the bending, the spacing between at least the bent contact pins to other components, in particular other connection regions or contact pins, is increased, thus improving or simplifying the insulation and increasing the creepage distance.

Some embodiments of a winding are characterized in that the contact pins are bent such that they are closer to one another along the circumference, with the contact pins each being bent such that they are closer to the majority of other adjacent contact pins of the same phase.

These contact pins, can all be bent in the same direction along the circumference. They can also be bent in opposing directions along the circumference. With two adjacent contact pins of the same phase, the contact pin on the left, seen in the radial direction, can thus be bent such that it protrudes further to the right, and the contact pin on the right can be bent such that it protrudes further to the left, thus obtaining contact pins that protrude at the same place. If there are more than two contact pins, they are preferably bent such that they protrude closer to the majority of the contact pins of the same phase, e.g. the two contact pins on the left are bent such that they protrude closer to the two contact pins on the right in the case of four parallel winding strands, in which case the two contact pins closer to the middle are bent to a lesser extent. With an odd number of contact pins, the middle contact pin can remain straight, while the contact pins on either side are bent to protrude closer to it. As a result, the overall bending of the individual contact pins can be kept lower than when they are all bent in the same direction, and the spacing in both circumferential directions can be increased slightly.

Some embodiments of the windings are characterized in that the wires have at least one region where they turn in the manner of a hairpin or form a wave-shaped conductor In addition to the connection regions and groove regions, the wires can also have a turning region between the groove regions, thus forming so-called hairpin turns, which are connected to one another in series via their connection regions that do not form contact pins on a winding strand, in order to form the winding strands.

The wires can also have numerous groove regions and turning regions, thus forming a wave-shaped conductor. This requires a low number of wires for each winding strand, potentially just one.

Some embodiments of a winding are characterized in that the contact pins are also twisted along the circumference. In particular with hairpin turns, the connection regions along the circumference are bent at a specific angle, normally in opposite directions in each layer. In these cases, the contact pins are also bent along the circumference at an angle corresponding to that of the other connection pins in the layer.

Embodiments of the windings are characterized in that numerous groove regions of wires are radially adjacent to one another in layers in each groove, and the contact pins are located in an outer radial layer.

To simplify contact to the contact pins, they are preferably located in the radially outermost and/or radially innermost layers.

Preferred embodiments of a winding are characterized in that the contact pins are also bent radially away from the other layers, in order to increase the spacing to radially adjacent turning regions and/or connecting regions in particular.

To ensure sufficient spacing in the radial direction with regard to creepage distances, and to simplify the connecting of contact pins or the connection regions of hairpin turns that are to be connected to one another, for example, the contact pins or preferably the respective layers are bent radially toward one another. This spacing can be obtained by bending or spreading one or both of the radially adjacent layers.

Another aspect of the invention relates to an electric machine that has a winding according to the description herein in the form of a stator winding and/or rotor winding in the electric machine. The advantages can consequently be applied to the electric machine, in particular with electric machines of a smaller diameter and/or higher voltage, e.g. 800V.

Another aspect of the invention relates to a drive train for a vehicle that comprises an electric machine according to description herein, in which the use of electric machines in the drive train that are smaller and/or can be operated with higher voltages is improved.

Another aspect of the invention relates to a method for the production of a winding according to the description herein, in which the method comprises the steps:

- e) placing the wires in the grooves on a coil body to form at least two layers;
- u) bending at least some of the contact pins such that the spacing therebetween along the circumference is reduced;
- t) twisting all of the contact pins and any other connection regions in a layer along the circumference.

After the wires, specifically the hairpin turns, have been placed in the coil body, the axially protruding regions are bent, thus forming the winding strands. The connection regions in one layer are bent to the same extent, the twisting angle, along the circumference for this. Any connection regions in an adjacent layer are preferably bent away therefrom, in particular to the same extent. This is also referred to as twisting.

Before or after the twisting, the contact pins in the same phases located in adjacent grooves are bent closer to one another along the circumference, in order to reduce the spacing between them. The contact pins can be bent in the same direction or in opposing directions for this. When they are bent in the same direction or in both directions, in particular if the number of contact pins in each phase is odd, one of the pins may remain unbent. This bending results in the advantages described in reference to the winding.

Some embodiments of the method are characterized in that there is an additional step w), in which the radial spacing, at least between the layer with the contact pins and the adjacent layer, is increased by bending at least one of the layers in the radial direction.

Adjacent layers are advantageously spread apart in the radial direction, such that they are spaced further apart radially than their groove regions in the grooves in the coil body. In this case as well, either just one of the layers can be bent radially, or both. If both are bent, the bending can take place as a function of the design and overall number of layers in the winding, in opposing or identical radial directions, to different extents.

This spreading—step w)—can take place prior to or after the other bending step—step u)—and/or twisting step—step t).

Some embodiments of methods are characterized in that after step e), the other steps can take place in an arbitrary order. The sequence of the bending is arbitrary, depending on the process chain.

Some embodiments of a method are characterized in that the step u) takes place prior to step t).

Because the bending of the contact pins such that they are closer to one another involves less bending than the twisting, this can advantageously take place prior to the twisting. The twisting can comprise a subsequent circular twisting of the contact pins that have been bent closer one another over the twisting angle.

Some embodiments of a method are characterized in that the bent contact pins are bent in the same direction along the circumference in step u).

Alternative embodiments of a method are characterized in that at least two contact pins are bent in step u), and in that these contact pins are bent in opposite directions along the circumference.

The features of the various embodiments can be combined with one another in any suitable manner.

BRIEF DESCRIPTION OF THE DRAWINGS

The invention shall be described in greater detail below in reference to the drawings. The same or similar elements are indicated with the same reference symbols. Therein.

DETAILED DESCRIPTION

Figure 1:
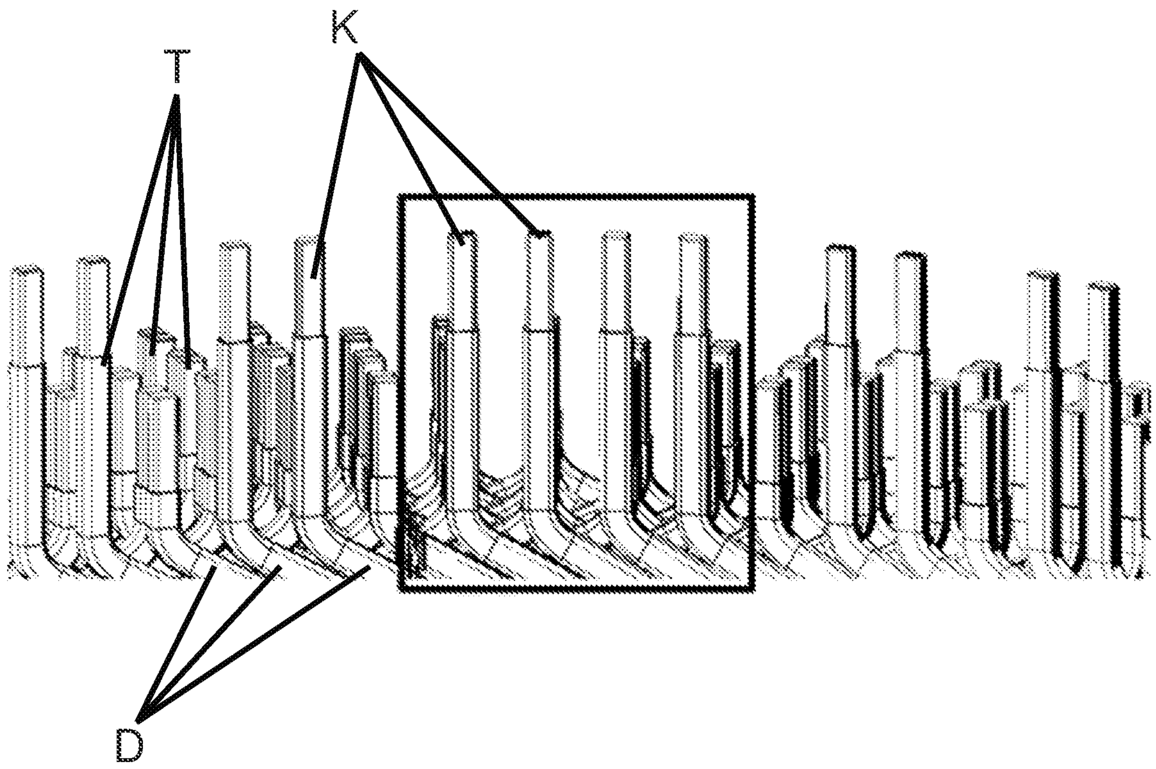
FIG. 1 shows a portion of a distributed winding according to the prior art.

FIG. 1 shows a portion of an axial region of a distributed winding. This is a distributed winding with the wires (D) forming hairpin turns. The connection regions (T) of the wires (D) in the coil body extend axially over the coil body. The connection pins (T) at each end of a winding strand are formed by the contact pins (K) and are longer in this exemplary embodiment that the rest of the connection regions (T).

Two adjacent poles in FIG. 1 that each have two contact pins (K) from parallel winding strands are indicated by a rectangular frame, which is not part of the winding.

The contact pins (K) are twisted to the same extent in the circumferential direction as the rest of the connection regions (T), for which reason they are flush in the radial direction with at least the equidistant connection regions in the circumferential direction. As a result, the contact pins (K) are also spaced apart equally. This results in the problem that, in order to connect the contact pins (K) to power electronics, they have to be connected to a wiring assembly individually, and the distance between different phases, in particular with regard to necessary creepage distances, particularly with high voltage applications, is very small and in some cases may be insufficient.

Figure 2:
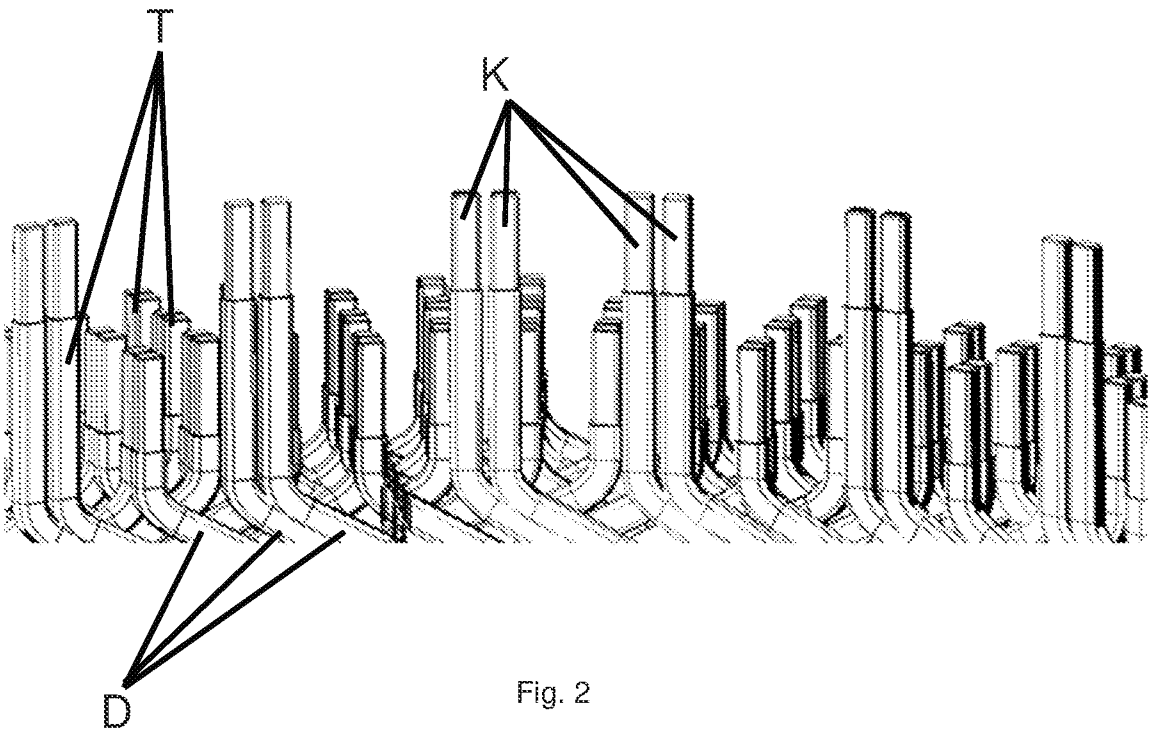
FIG. 2 shows a portion of an exemplary embodiments analogous to that shown in FIG. 1.

FIG. 1 therefore represents one possible initial situation that can be improved with the present invention FIG. 2 illustrates a construction that is analogous to that in FIG. 1, for which reason reference is made to the above description. Unlike in FIG. 1, the contact pins (K) are bent along the circumference, as well as being twisted at an angle that is identical to that in the rest of the connection regions (T), in order to reduce the spacing between contact pins (K) of the same phase, or bring parallel winding strands in a pole closer together.

In this exemplary embodiment, there are two parallel winding strands in each case. As can be clearly seen in comparison to FIG. 1, the spacings between the contact pins (K) of different phases are increased, thus increasing the creepage distances and improving the insulation to one another.

Figure 3:
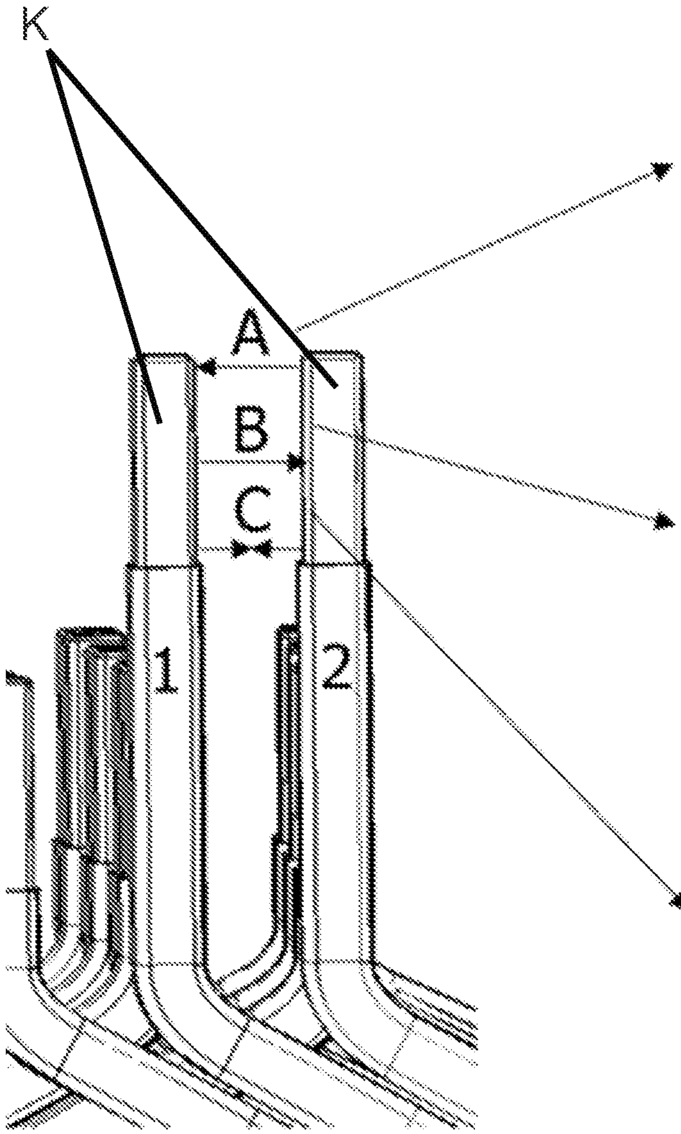
FIG. 3 shows another, enlarged region containing a pole.

FIG. 3 also shows, by way of example, two contact pins (K) on parallel winding strands in a pole. These are marked as "1" and "2" in FIG. 3. There are three ways in which these two contact pins (K) can be bent closer to one another in accordance with the invention. The paths along which they are bent in these three variations are indicated schematically in FIG. 3 by arrows indicated with the letters "A," "B," and "C." The results of the three variations are indicated in the corresponding figures, FIGS. 3A, 3B, and 3C.

Figure 3A:
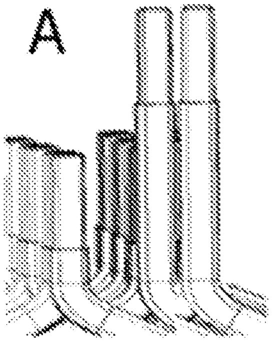
FIGS. 3A to 3C show alternative exemplary embodiments based on FIG. 3.

In FIG. 3A, the contact pin (K) with the numeral "2" is bent closer to the contact pin (K) with the numeral "1," thus increasing the creepage distance to the components toward the right in FIG. 3.

Figure 3B:
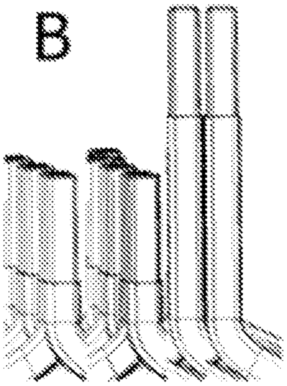

In FIG. 3B, the contact pin (K) with the numeral "1" is bent closer to the contact pin (K) with the numeral "2," thus increasing the creepage distance to the components toward the left.

Figure 3C:
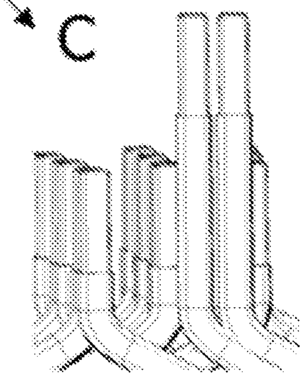

In FIG. 3C, both contact pins (K), i.e. "1" and "2," are bent closer one another, and thus lie between the connection regions (T) in the other adjacent layers. This increase the creepage distances on both sides, and also reduces the distance that the contact pins (K) are shifted in comparison with the variations shown in FIGS. 3A and 3B.

Figure 4:
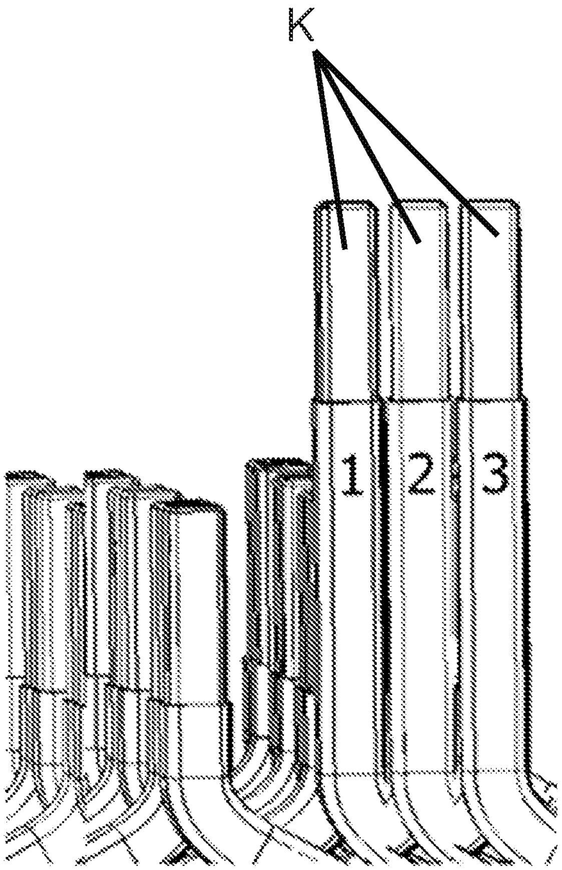
FIG. 4 shows another exemplary embodiment.

FIG. 4 shows another exemplary embodiment in an illustration analogous to that shown in FIGS. 3, 3A, 3B, 3C, in which there are three parallel winding strands, and therefore three adjacent contact pins (K), for each pole.

The individual contact pins (K) are numbered, i.e. "1," "2," and "3," analogously to those in FIG. 3. In this exemplary embodiment, the contact pins (K) with the numerals "2" and "3" are bent closer to the contact pin (K) "1", such that contact pin (K) "3" is shifted further than contact pin (K) "2."

As shown in FIGS. 3B and 3C, the contact pins can be shifted in the other direction, or in both directions. When shifted as shown in FIG. 3C, the middle contact pin (K) "2" can remain in place, or it can be moved slightly toward one of the other two contact pins (K) "1" or "3."

The invention is not limited to the embodiments described herein. It can also comprise only some of the advantageous features, or numerous advantageous features can be combined with one another, as explained above.

REFERENCE SYMBOLS

D wire
T connection region
K contact pin

The invention claimed is:

1. A distributed winding for an electric machine, comprising:

a coil body with a plurality of grooves distributed over a circumference of the coil body;

wherein there are at least two poles for the winding, at least two parallel winding strands for each pole, wherein each winding strand includes at least one wire, the at least one wire having at least one groove region that runs axially in a groove and has a connection region at both ends, wherein the connection regions protrude axially above the coil body, wherein each winding strand has a plurality of contact pins that form connection regions on the both ends, and wherein at least some of the contact pins in the same phase are located in adjacent grooves, and wherein at least one of the adjacent contact pins in the same phase is bent along the circumference in order to minimize the spacing between the contact pins and to increase the spacing between contact pins of different phases.

2. The winding according to claim 1, wherein the contact pins are bent in a circumferential direction such that the contact pins are each bent closer to the majority of the other adjacent contact pins that have the same phase.

3. The winding according to claim 1, wherein the wires have at least one turning region in the form of a hairpin, or form a wave-shaped conductor.

4. The winding according to claim 1, wherein the contact pins are twisted along the circumference.

5. The winding according to claim 1, wherein a plurality of groove regions of the wires lie in adjacent radial layers in each groove, and wherein the contact pins are located in an outer radial layer.

6. The winding according to claim 5, wherein the contact pins are also bent radially away from the other layers in order to increase the spacing to radially adjacent turning regions and/or connection regions.

7. An electric machine that has a winding according to claim 1, forming a stator winding and/or rotor winding.

8. A drive train for a vehicle that contains an electric machine according to claim 7.

9. A method for producing a winding, the method comprising:

placing wires in corresponding grooves on a coil body to form at least two layers;

bending at least some of a set of the contact pins in a same phase and are located in adjacent grooves such that the spacing therebetween along the circumference is reduced relative to an unbent orientation and such that the spacing between contact pins of different phases is increased; and twisting the contact pins in a layer along the circumference.

10. The method according to claim 9, wherein a radial spacing, at least between the layer with the contact pins and an adjacent layer, is increased by bending at least one of the layers in the radial direction.

11. The method according to claim 9, wherein placing the wires in the corresponding grooves on the coil body occurs prior to bending the contact pins and twisting the contact pins.

12. The method according to claim 10, wherein bending the at least some of the set of the contact pins such that the spacing therebetween along the circumference is reduced relative to the unbent orientation occurs prior to twisting the contact pins.

13. The method according to claim 9, wherein the contact pins that have been bent are shifted in the same direction along the circumference.

14. The method according to claim 9, wherein at least two contact pins are bent, and wherein these at least two contact pins are shifted in opposite directions along the circumference.

* * * * *